May 31, 1960     I. J. VOULLAIRE     2,938,315

METHOD AND APPARATUS FOR PACKING FRUIT

Filed Jan. 27, 1958     4 Sheets-Sheet 1

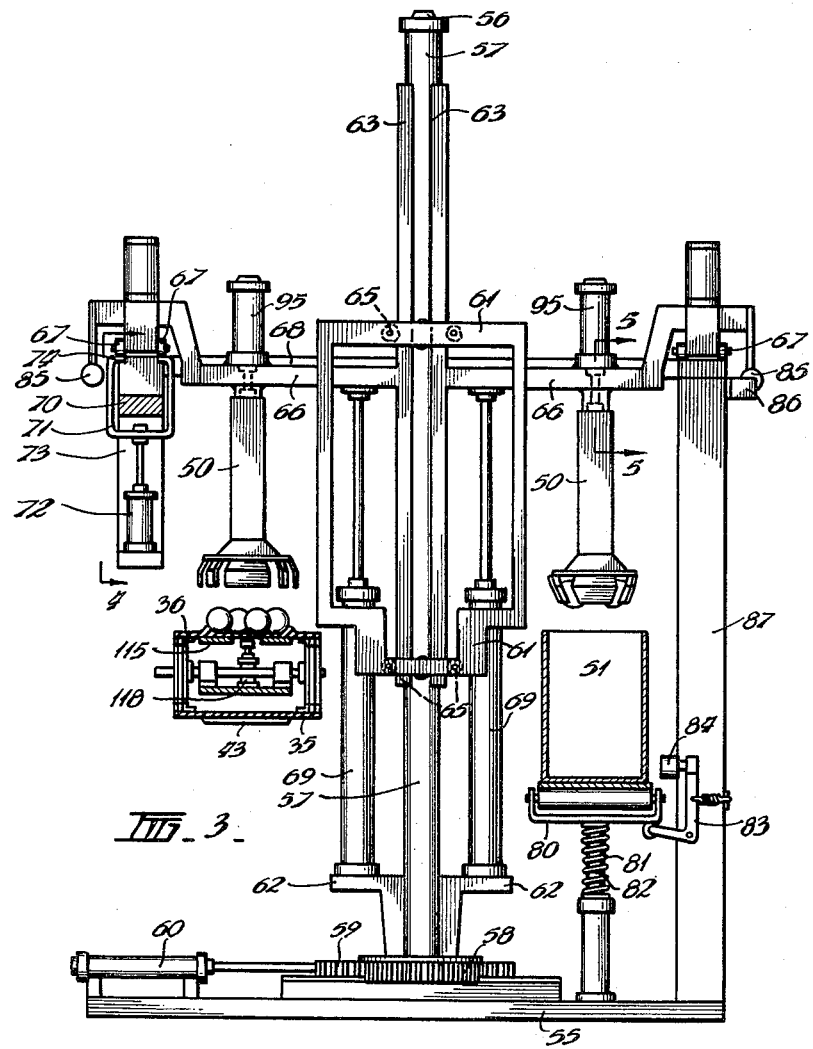
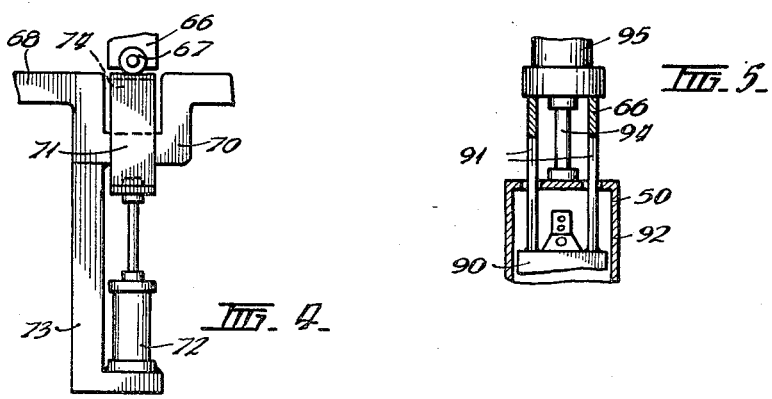

May 31, 1960 — I. J. VOULLAIRE — 2,938,315
METHOD AND APPARATUS FOR PACKING FRUIT
Filed Jan. 27, 1958 — 4 Sheets-Sheet 3
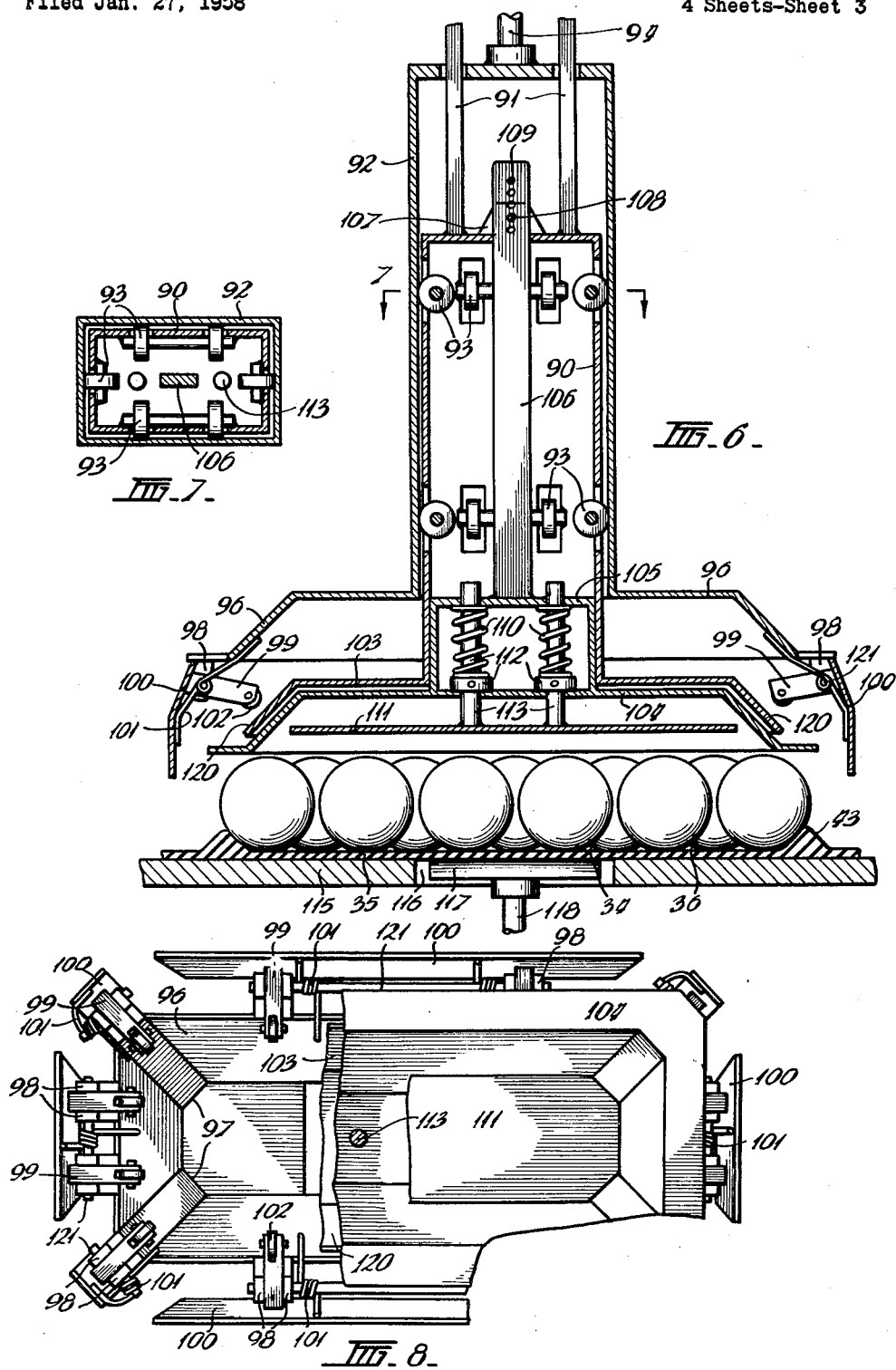

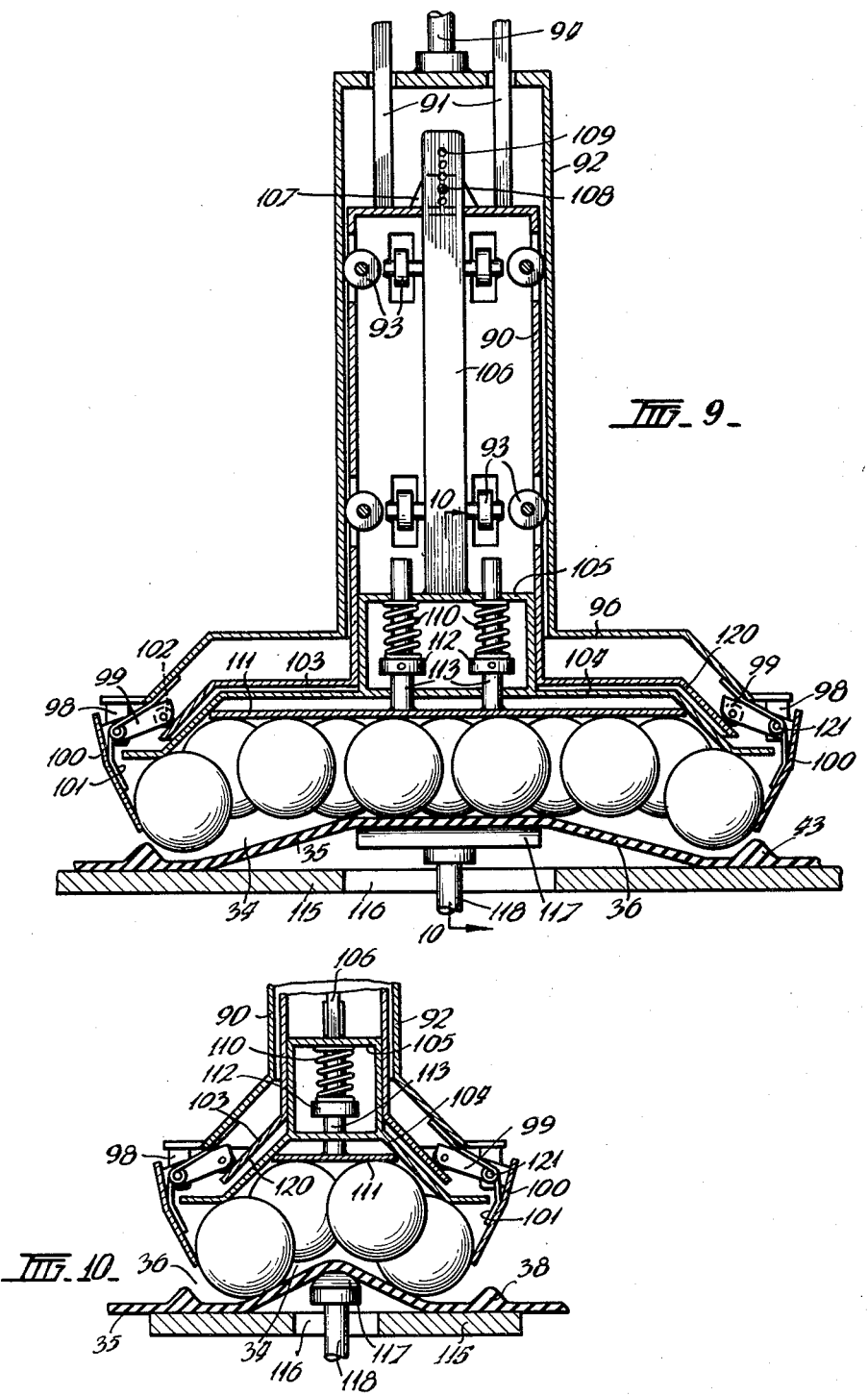

United States Patent Office 2,938,315
Patented May 31, 1960

2,938,315

METHOD AND APPARATUS FOR PACKING FRUIT

Izak Johannes Voullaire, P.O. Box 543,
Mildura, Victoria, Australia

Filed Jan. 27, 1958, Ser. No. 711,272

Claims priority, application Australia Jan. 29, 1957

19 Claims. (Cl. 53—35)

This invention relates to the art of packing fruit in cases and is particularly though not exclusively directed to the packing of citrus fruit e.g. oranges.

It is customary in the present practice governing the packing of citrus fruits in Australia that each layer of fruit shall be made up of a number of transverse rows each containing two pieces of fruit, and having alternate transverse rows in substantial longitudinal alignment while successive rows are staggered relative to one another by an amount approximately equal to half the diameter of the fruit. The practice also requires that the transverse rows of fruit in one layer to be staggered by a similar amount in relation to the row immediately below it.

By arranging the rows and layers of fruit in this manner the most economic use of the cubic capacity of the fruit case is obtained. This arrangement also gives a degree of interlocking between the layers of fruit and thus reduces the possibility of damage to the fruit by movement within the case during transit.

It will be understood that the cases used for this purpose are standardized, having predetermined basic dimensions which constitute the dimensions of each layer of fruit, and being of predetermined height.

It is the present practice to manually pack the fruit in layers in the cases with the rows of fruit in the required formation and notwithstanding the use of skilled labour the operation is time consuming and costly under prevailing labour costs.

Thus it is the principal objective of the present invention to provide an efficient method of mechanically packing fruit in cases without the use of usual manual labour, the method of handling the fruit being such as to prevent or at least reduce to a minium the possibility of damage to the fruit.

A further objective of the invention is to provide such a mechanical method of packing fruit in layers as to achieve the layered packing of the fruit in the desired progressive row formation comparable with the packing achieved by manual labour.

With the above stated objectives in view there is provided, according to the invention, the method of mechanically packing fruit in cases comprising the steps of forming a layer of fruit with the fruit arranged in predetermined row formation to fit a selected fruit case, engaging the layer so as to maintain it intact, transferring the layer to a release position disposed relative to the fruit case, and releasing the layer whereby the fruit will assume the said row formation in said case.

It is a feature of the method that the layer of fruit preparatory to being moved towards the case, is engaged in such manner as to be maintained intact and in the required formation during transfer to the case.

In carrying out the method above defined, the initial step comprises feeding the fruit in a number of rows corresponding to the packing position whereby a layer of the fruit is assembled in the precise row formation that the layer will take when deposited in the case.

In one application the layer of fruit thus formed, which is substantially rectangular and of the said predetermined size, is subjected to inwardly directed peripheral pressure to maintain the fruit in the required formation. To prevent disintegration of the layer, however, whilst being bodily moved to the release position relative to the fruit case, the layer is preferably converted to and maintained in a convex or domed shape against a suitable former. The open, unsupported side of the layer, opposite to the former, is thus concave and, on the principle of the arch, the layer is prevented from collapsing even when downwardly directed.

To contribute to the maintenance of the mass assembly of the layer of fruit with each particle touching, resilient means may also be applied to the particles of fruit to thus provide a compact mass of the abovementioned form.

The fruit case is either timed to move to a position to coincide with the layer of fruit reaching the release position, or is held in the latter position, whereby the layer of fruit, upon the said pressure being released, falls in its row formation to assume that position in the case. The layer spreads from the convex form after being released in the case to neatly fill the basic area of the latter.

The height of the fruit case relative to the transported layer, or vice versa, is determined whereby the fruit when released contacts the bottom of the case, or the previous layer therein, according to the degree of progress in packing the fruit in the case, which is accomplished layer by layer.

In the method of the invention, preferably as one layer of fruit is being formed the preceding layer is being released in the fruit case so as to maintain continuity of operation and rapid filling of the case.

To implement the above stated method there is provided, according to the invention, apparatus for mechanically packing fruit in cases comprising means for delivering articles of fruit to form a layer thereof with the fruit in predetermined row formation to fit a selected fruit case, means co-operating with said first mentioned means to, firstly, engage the layer so as to maintain it intact, secondly transfer the layer to a release position disposed relative to the fruit case, and thirdly, release the fruit whereby the latter will assume within the fruit case the said row formation.

More specifically in one application the invention provides apparatus comprising feeding mechanism for intermittently feeding fruit in rows onto a boundaried area of predetermined size, each row being staggered relative to the next, the progressive row formation being as specified and determined by relative movement of the feeding mechanism and the boundaried area to form a layer of fruit of predetermined dimensions; transporter mechanism for transferring the said layer to a fruit case, said transporter mechanism comprising means for exerting inwardly directed peripheral pressure upon the fruit in the layer whilst the latter is caused to assume a convex contour against a former in the transporter mechanism to retain the layer, means intermittently operative to transfer the layer in the transporter mechanism to a release position above and in vertical alignment with an open side of the fruit case and then lower the layer towards the interior of the case, means for releasing the fruit when the layer is in required vertical position in the case and thereafter retracting the transporter mechanism away from the case, and means for alternately locating and removing a fruit case into and out of required release position relative to the transporter mechanism at predetermined intervals for the purpose specified.

Apparatus according to the invention may take a variety of forms. For example, the boundaried areas may be defined in the transporter mechanism itself which may have one or more carrier arms, preferably at least two. Each such arm has a pick-up head which is intermittently inverted so that it presents a boundaried area upwardly directed to receive the fruit in the specified row formation to form a layer at one station, said carrier arm being subsequently moved to the release position at another station, during which process its attitude is reversed so that the transferred layer is downwardly directed on reaching the second station where it is released.

Again, the boundaried areas may be arranged in spaced relation on an intermittently moving endless conveyor belt from which the layers when formed at such a first station are alternately picked up by the pick-up head of a carrier arm of the transporter and moved to the release position at a second station where they are released as previously described.

In either of the above arrangements the two carrier arms may be radially opposed about a central pivot of the transporter mechanism whereby they may rotate from station to station, or oscillate between the stations. By this arrangement the two pick-up heads alternate between picking up and releasing a layer of fruit, the process being continuous.

For locating the fruit cases for filling and removing them when filled, conveyor means is conveniently employed.

The various operations may be mechanically synchronized by a variety of means to render the apparatus automatic or partly automatic.

One practical arrangement of apparatus according to the invention will now be described with reference to the accompanying drawings.

In the drawing:

Figure 3 is an end elevation of the apparatus shown in Figure 1 and includes details of the transporter mechanism of which both carrier arms are shown.

Figure 4 is a view of section 4—4 in Figure 3 showing the mechanism which controls the downward movement of the pick-up head when picking up the layer of fruit from the conveyor belt.

Figure 5 is a view of section 5—5 in Figure 3 showing one method of attaching the pick-up head to the carrier arm.

Figure 6 is a sectional side elevation of a pick-up head, positioned over a layer of fruit on the conveyor belt, in readiness for the picking up of the layer of fruit.

Figure 7 is a view of section 7—7 in Figure 6 showing mechanism for guiding the outer casing over the inner casing of the pick-up head.

Figure 8 is a cut-away plan of the pick-up head when viewed from the conveyor belt.

Figure 9 is a sectional side elevation of the pick-up head in engagement with a layer of fruit.

Fig. 10 is a view of section 10—10 in Figure 9.

Figures 1, 2:
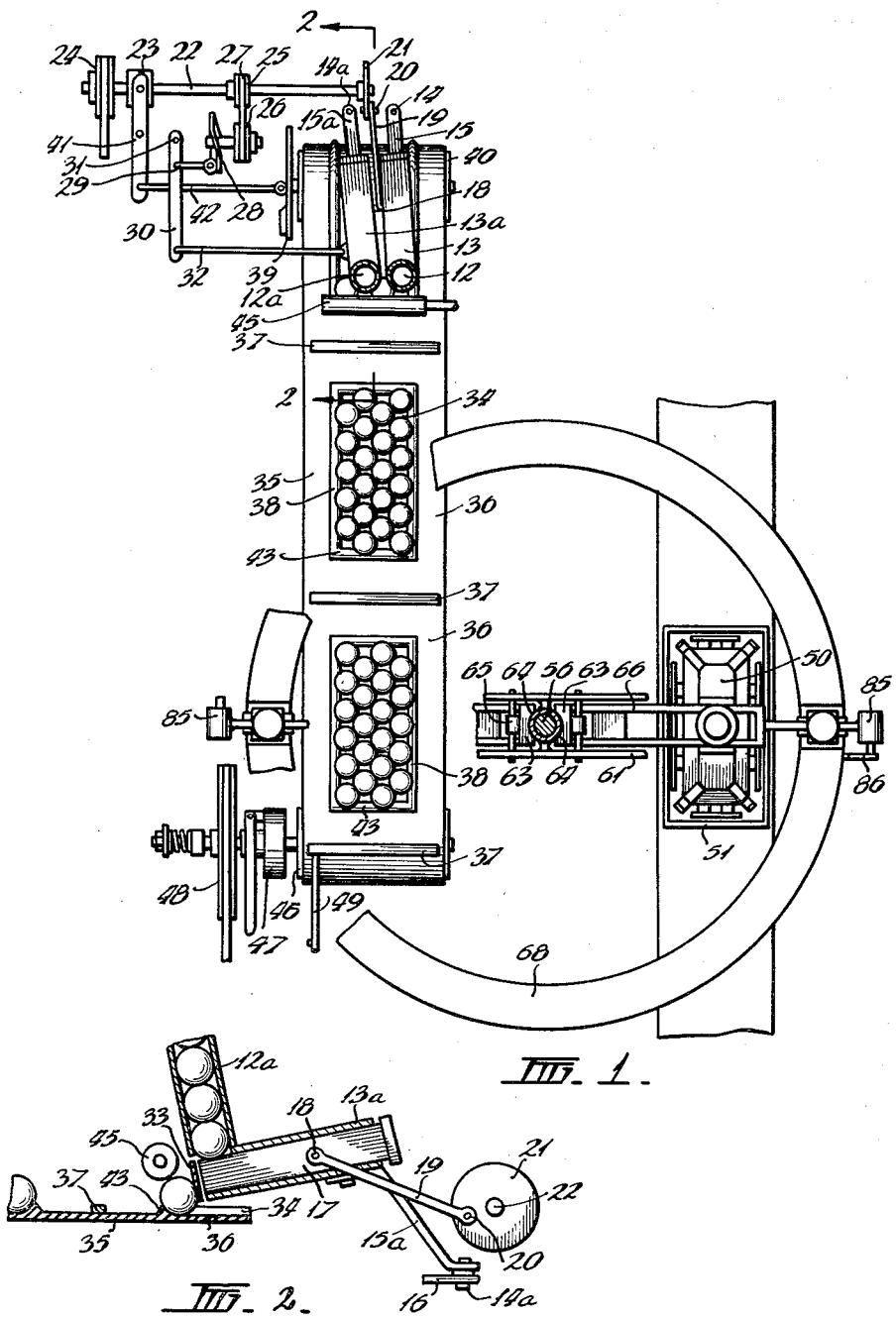
Figure 1 is a plan view of the apparatus with one carrier arm assembly and portion of a circular arm-supporting track removed to show the fruit conveying belt.
Figure 2 is a view of section 2—2 in Figure 1 showing a fruit chute and ejector mechanism.

Referring now to Figure 1, the fruit to be packed is fed from a storage hopper (not shown) through two parallel chutes 12 and 12a to respective ejector cylinders 13 and 13a. Each of the ejector cylinders is pivotally connected to the frame 16 (Fig. 2) of the machine by their respective pivot pins 14 and 14a, and pivot arms 15 and 15a.

Each ejector cylinder has a ram, one of which is indicated at 17 in Figure 2, which slides freely therein. The two rams are rigidly connected by the pin 18 which in turn is connected by the connecting rod 19 to the pin 20 eccentrically positioned on the disc 21. It will be seen that the two cylinders are interconnected by means of their respective rams and the pin 18, which latter operates in clearance slots in the said cylinders.

The disc 21 is rigidly connected to the shaft 22 which is driven, through the clutch 23 and pulley 24, by an electric motor or other source of power not shown.

Also driven by the shaft 22, through the sprockets 25 and 26 and the chain 27, is a cam disc 28. A cam follower 29 engages the cam disc 28 and is connected to a link 30 pivotally connected to the frame of the machine by the pin 31.

The end of the link 30, furthermost from the pivot pin 31, is connected by a rod 32 to the ejector cylinder 13a. The two interconnected ejector cylinders 13 and 13a are thereby caused to oscillate about their respective pivot pins 14 and 14a in response to the rotation of the cam disc 28.

The oscillation of the ejector cylinders is timed in relation to the stroke of the rams 17 therein so that a piece of fruit is ejected from each cylinder at each end of the oscillation period of said cylinders.

A resilient flap 33 (Figure 2) is disposed over the open end of each ejector cylinder to prevent the fruit from rolling out of the cylinder prior to the ejection stroke of the ram 17.

Passing below the open ends of the ejector cylinders 13 and 13a is an endless conveyor belt 35 divided into a number of equilength sections 36 by rigid stop bars 37.

Each of these equilength sections 36 has a centrally disposed boundaried area which acts as a fruit receiving zone 34, defined by projecting ridges 38 and 43 formed on the surface of the conveyor belt 35.

Discharge of the fruit from the ejector cylinders into the receiving zone 34 is regulated by the clutch 23 which is operated through a cam follower 42 and link 41, by a cam plate 39 attached to a conveyor belt roller 40.

The cam plate 39 is timed in relation to the travel of the conveyor belt so that the clutch 23 is engaged, and hence discharge of the fruit from the ejector cylinders commenced, when the leading ridge 43 of the fruit receiving zone has just passed the open end of the ejector cylinders.

The oscillation of the ejector cylinders is also timed in relation to the travel of the conveyor belt so that the said cylinders are in alternate extreme positions of oscillation when discharge of the fruit commences into successive receiving zones.

Discharge of fruit is ceased by the cam plate 39 disengaging the clutch 23 when each receiving zone 34 has been filled.

By this timed relationship between the oscillation of the ejector cylinders 13 and 13a, the discharge stroke of the rams 17, and the travel of the conveyor belt 35, a layer of fruit having the desired row formation is developed in each receiving zone 34.

A roller 45 is driven, through any suitable means, such as a series of sprockets and a chain by the roller 40, so that its lower surface is travelling in the same direction as the adjacent conveyor belt. This roller 45 prevents the first two pieces of fruit ejected from rolling over the projecting ridge 43.

The provision of some means to prevent the fruit rolling over the projecting ridge 43 is preferable as the height of the ridge should not exceed approximately one quarter of the height of one piece of the fruit being packed. The reason for this limitation will become apparent at a later stage in the description.

The conveyor belt 35 is positively driven by a roller 46, which in turn is driven through the limit-load clutch 47 and pulley 48 by an electric motor or other source of power.

As each receiving zone 34, with its layer of fruit, reaches a position directly under a pick-up head 50 (see Figure 3), the stop bar 37, immediately preceding that receiving zone, engages a stop arm 49 thus increasing the load on the limit-load clutch 47 causing it to disengage and the conveyor belt to stop.

The pick-up head 50 is so positioned in relation to the ejector cylinders that when a layer of fruit is directly under the pick-up head the clutch 23 is disengaged and ejection of the fruit is not in progress.

Referring now to Figure 3 wherein is shown the transporter mechanism for picking up the layer of fruit from the conveyor belt and depositing it in a fruit case in the same layer formation.

A base frame 55 rigidly supports a central column 56 about which an outer tube 57 is freely rotatable.

Rigidly attached to the lower end of the outer tube 57 is a pinion 58 which is rotated by a rack 59 actuated by a hydraulic cylinder 60.

A guide frame 61 and cylinder supports 62 are rigidly attached to the outer tube 57.

The two carrier guides 63 each have their inner faces 64 (Fig. 1) machined to mate with the outer tube 57, and are held in engagement therewith by the rollers 65 carried in the guide frame 61.

The carrier arms 66 are rigidly connected at their inner ends to their respective carrier guides 63 and are supported at their outer ends by rollers 67 which run on the circular track 68 (see also Figure 1).

Each carrier arm 66 can be raised and lowered independently of the other by their respective hydraulic cylinders 69 mounted on the cylinder supports 62.

A pick-up head 50 is carried by each carrier arm 66 and is positioned thereon to be disposed centrally above the layer of fruit on the boundaried area of the conveyor belt in one position of the carrier arm (i.e. a first station) and above the fruit case 51 when the arm is rotated through 180° from the first mentioned position, (i.e. a second station).

The track 68 has a stepped portion 70 coinciding with the position occupied by the carrier arm rollers 67 when the pick-up head is positioned centrally above the layer of fruit to be picked up.

A U-shaped bracket 71 with inwardly projecting flanges 74 is disposed about this stepped portion 70 of the track and is maintained with its upper surface in line with the normal upper surface of the track 68 by a hydraulic cylinder 72. The hydraulic cylinder 72 is carried on a bracket 73 depending from the track 68.

This hydraulic cylinder is controlled by a valve (not shown) connected to the stop arm 49 (Fig. 1), and will not allow the carrier arm and pick-up head to be lowered until the conveyor belt has stopped, with a layer of fruit correctly positioned below the pick-up head.

The amount of downward movement of the pick-up head is also controlled by adjusting the stroke of the hydraulic cylinder 72.

When the conveyor belt has stopped with a layer of fruit correctly positioned, the carrier arm 66 and pick-up head 50 are lowered by the hydraulic cylinder 69.

The mechanism of the pick-up head for gripping and releasing the layer of fruit will be described at a later stage and it will now be assumed that the pick-up head has gripped the layer of fruit and returned to its previous "up" position, whereat the stop arm 49 and clutch 47 are tripped (by means not shown) to reconnect the conveyor drive.

The carrier arm with the pick-up head gripping the layer of fruit is now rotated on the central column 56, together with the outer tube 57, by the rack 59 and pinion 58 to the second station in a position above the fruit case 51.

To effect this location, hydraulic cylinder 60, which actuates the rack 59, is controlled by a valve 85 attached to the outer ends of the carrier arms 66, which co-acts with means 86 on the track supporting member 87.

Figure 6 shows a sectional side elevation of the pick-up head 50 lowered into position to grip the layer of fruit on the conveyor belt 35.

The inner casing 90 is rigidly attached to the carrier arm 66 by two rods 91. Outer casing 92, slidably guided on the inner casing by a series of rollers 93, is connected to the piston rod 94 of a double acting hydraulic cylinder 95 attached to the carrier arm 66 (Fig. 5).

Flange 96 attached to the lower end of the outer casing 92 has all four corners chamfered as indicated at 97 (Fig. 8) and is hat shaped in cross section in both principal directions.

A series of lugs 98 are attached to the lower edge of the inclined side, end and corner faces of the hat shaped flange 96. Pivotally connected to these lugs, by rocker arms 99, are a number of flaps 100 which are maintained in a substantially vertical position by springs 101. The inner edge of each rocker arm 99 has a roller 102.

Inner casing 90 has a cam flange 103 at its lower end which is similar in shape to the flange 96 on the outer casing 92.

A fruit supporting member 104 is guided within the inner casing 90 by a projecting frame 105 and is retained therein by a tongue 106, bracket 107 and pin 108.

The position of the fruit support member 104 relative to the inner casing 90 can thus be varied for different sizes of fruit by means of the series of holes 109 in the upper end of the tongue 106.

Springs 110 control the vertical position of a pressure plate 111 through collars 112 and guide pins 113.

The portion of the conveyor belt 35 immediately below the pick-up head, and which includes the fruit receiving zone 34, is firmly supported by a plate 115 having a central aperture 116. Within this aperture is positioned a pusher bar 117 actuated by hydraulic cylinder 118 (Figure 3).

After the pick-up head has been lowered into the position shown in Figure 6, hydraulic pressure is applied to cylinder 95 to cause the outer casing 92 to descend relative to the inner casing 90.

As the outer casing 92 moves downwards the rollers 102 on the rocker arms 99 contact the inclined faces 120 of the cam flange 103. Further downward movement of the outer casing causes the rocker arms 99 to pivot about the pins 121 and the flaps 100 to grip the perimetric rows of fruit.

At the same time as the flaps 100 are moving to grip the outermost rows of fruit the pusher bar 117 is raised by the hydraulic cylinder 118, causing the conveyor belt and the layer of fruit thereon to take up a convex configuration as shown in Figures 9 and 10, the member 104 and the plate 111 acting as a former for this purpose.

Once this convex configuration has been initially imparted to the layer of fruit the pressure exerted by the flaps 100 on the perimetric rows of fruit, and by the pressure plate 111 on the inner rows, is sufficient to retain the fruit in this position.

Thus the layer of fruit is positively located within the pick-up head in the same row formation as it possessed on the conveyor belt.

The pick-up head is now raised, rotated to a position above the fruit case 51, and lowered into the latter as previously described.

When the valve 84 is operated by the downward movement of the fruit case 51 the pressure in the double acting hydraulic cylinder 95 is reversed. This causes the outer casing to move upwards relative to the inner casing allowing the flaps 100 to release their grip on the perimetric rows of fruit and thus deposit the layer of fruit in the fruit case in the correct row formation.

It will be seen that this last described operation of releasing the fruit will be effective irrespective of the number of layers of fruit previously deposited in the case, since the laden pick-up head continues to descend, until it produces the predetermined pressure necessary to operate the valve 84.

Likewise, it will be appreciated that, in the double-header machine described, when one pick-up head is operatively positioned at one station, the other such head will automatically arrive at its correct operative position at the other station.

The series of hydraulic valves and relays necessary for the operation of this machine have not been shown or described as they are all of a type well known to hydraulic engineers.

Although the machine described has two pick-up heads, a greater number could, of course, be employed. Likewise, more than one layer-forming mechanism and conveyor belt may be incorporated in the one machine if required with corresponding increase in output.

I claim:

1. Apparatus for mechanically packing fruit in cases comprising means for delivering articles of fruit to form a layer thereof at a pick-up position with the articles in predetermined row formation, means co-operating in timed relation with said first mentioned means to, firstly, engage with and deform the layer at the pick-up position to dispose the articles of fruit in a convex form whereby the articles of fruit are supported in the layer, secondly, lift and move the convex layer of fruit to a release position disposed relative to a fruit case of predetermined dimensions, and thirdly, release the layer of fruit to assume within the fruit case the said row formation.

2. Apparatus for mechanically packing fruit in cases comprising feeding mechanism for intermittently feeding fruit in rows onto a boundaried area of predetermined size, each row being staggered relative to the next, the progressive row formation being determined by relative movement of the feeding mechanism and the boundaried area to form a layer of fruit of predetermined dimensions; transporter mechanism for transferring the said layer to a fruit case, said transporter mechanism comprising means for exerting inwardly directed peripheral pressure upon the fruit in the layer whilst the latter is caused to assume a convex contour against a former in the transporter mechanism to retain the layer, means intermittently operative to transfer the layer in the transporter mechanism to a release position above and in vertical alignment with an open side of the fruit case and then lower the layer towards the interior of the case, means for releasing the fruit when the layer is in required vertical position in the case and thereafter retracting the transporter mechanism away from the case, and means for alternately locating and removing a fruit case into and out of said release position at predetermined intervals for the purpose specified.

3. Apparatus according to claim 2, wherein the feeding mechanism comprises a plurality of oscillatable fruit ejector cylinders operating in conjunction, each cylinder having a ram reciprocable therein, said rams operating in conjunction.

4. Apparatus according to claim 3, wherein hopper means supply fruit singly to each cylinder for ejection by the ram, means being provided to prevent discharge of fruit other than by ejection by the ram.

5. Apparatus according to claim 4, wherein the boundaried area is formed upon an endless conveyor belt disposed immediately below the ejector cylinders of the feeding mechanism and positively driven with respect thereto in timed relation, means being provided to stop the feeding mechanism when the required number of rows of fruit has been deposited onto the boundaried area to form a layer of the specified formation, and means being provided subsequently to halt the conveyor when the thus laden boundaried area arrives at a first station in the apparatus.

6. Apparatus according to claim 2, wherein the transporter mechanism comprises a plurality of carrier arms radially disposed about a central pivotal axis, said carrier arms being adapted to alternate between a pick-up position at the said first station and the release position at a second station in the apparatus.

7. Apparatus according to claim 6, wherein each carrier arm comprises a vertically movable pick-up head having inwardly retractable peripheral flaps adapted to grip the perimetric rows of fruit of the layer when the pick-up head is lowered onto said layer formed upon the boundaried area at the said first station.

8. Apparatus according to claim 7, having means for simultaneously raising the central portion of the boundaried area of the conveyor belt whilst the pick-up head is gripping the perimetric rows of the layer of fruit thereon whereby the layer assumes a convex contour inwardly of the pick-up head by which it is retained during transfer to the second station.

9. Apparatus according to claim 8, having means to lower the pick-up head onto the layer of fruit formed on the boundaried area when the latter is in vertical alignment with the former at the first station, said means being reversible to raise the pick-up head after the layer has been picked up thereby, and means to angularly displace the thus laden pick-up head from the first station to the second station, whereat the first mentioned means is operable to lower the pick-up head to effect release of the fruit in the fruit case and thereafter raise the pick-up head to its initial position, whereupon the second-mentioned means is operable to angularly displace the unladen pick-up head from the second station to the first station when the cycle is repeated in timed relation with the operation of the conveyor belt.

10. Apparatus according to claim 7, wherein each pick-up head comprises a first member rigid with the carrier arm and a second member reciprocably mounted upon the first member, the second member having a flange at its lower extremity substantially the shape of the layer of fruit to be picked up, the said peripheral flaps being arranged at the periphery of this flange from which they are downwardly directed.

11. Apparatus according to claim 10, wherein the flaps are provided with inwardly directed levers pivotally supported at or adjacent to the periphery of the flange, said levers being adapted to contact a cam-flange at the lower extremity of the first member when the second member is moved downwardly relative thereto, thereby actuating the flaps to move angularly inward simultaneously with their downward movement.

12. Apparatus according to claim 11, wherein the flaps are adapted when in their lowermost position to grip the perimetric rows of fruit at a level substantially below the centre thereof.

13. Apparatus according to claim 11 wherein the flaps are spring biased to return to their inoperative position when the second member is moved upwardly relative to the first member and the levers are released from the cam-flange thus releasing the fruit.

14. Apparatus according to claim 10, wherein the first member is provided with a vertically adjustable fruit supporting member disposed at its lower extremity which in turn contains a spring loaded pressure plate, the said member and plate together serving as a former against which the layer of fruit is formed into convex contour at the picking up stage whilst providing adjustment means whereby the pick-up head is rendered adaptable to fruit of different size.

15. Apparatus according to claim 7 wherein the fruit case is supported at the second station by resilient means adapted to operate control means whereby when downward pressure is exerted upon a layer of fruit in the case the resilient means is depressed and thereby operates the control means to automatically release the fruit and retract the pick-up head from the case irrespective of the number of layers of fruit in the said case.

16. Apparatus according to claim 9 wherein the boundaried area is formed as a fruit receiving zone having raised ridges at its boundaries arranged to define a substantially rectangular area of predetermined dimensions, there being a plurality of such fruit receiving zones equidistantly spaced along the conveyor belt, said belt being longitudinally divided into a number of equilength sections by rigid transverse stop bars each section containing a centralley disposed fruit receiving zone, said stop bars being operative to actuate control means for halting the conveyor when a fruit receiving zone arrives at the said first station, and means being provided for restarting the conveyor when the layer of fruit on the said zone has been picked up by the pick-up head.

17. Apparatus according to claim 7 wherein the operation of the transporter mechanism, the carrier arms, and the pick-up heads is effected by hydraulic means.

18. The method of mechanically packing fruit in cases comprising the steps of mechanically feeding the fruit in progressive rows on to a boundaried area of predetermined size corresponding to the packing position in the case to form a layer of fruit in staggered row formation determined by relative movement of the feeding means and the boundaried area, subjecting the layer to peripheral pressure whilst causing it to assume a convex form to retain the fruit in the layer so formed, transferring the layer by transporter mechanism to a release position above and in vertical alignment with the fruit case and then disposing the layer within the case, releasing the fruit when the layer is in required vertical position in the case, and thereafter retracting the transporter mechanism away from the case.

19. The method according to claim 18 in which the layer of articles of fruit is released by pressure exerted by said layer upon the fruit case whereby the release is effected within the fruit case.

References Cited in the file of this patent

UNITED STATES PATENTS

| | | |
|---|---|---|
| 1,612,444 | Kimball et al. | Dec. 28, 1926 |
| 2,143,847 | Gordon | Jan. 17, 1939 |
| 2,184,290 | Dodge | Dec. 26, 1939 |
| 2,815,622 | Barrett | Dec. 10, 1957 |